United States Patent

Fehler et al.

[15] 3,688,495
[45] Sept. 5, 1972

[54] CONTROL SYSTEM FOR METERING THE FUEL FLOW IN GAS TURBINE ENGINES

[72] Inventors: Adolf Fehler, Baumlstrasse 10, 8031 Puchheim; Christian Greune, Bahnhofsstrasse 8, 8081 Schongeising; Hilbert Holzhauer, Leopoldstrasse 127/129, 8000 Munich, all of Germany

[22] Filed: April 17, 1970

[21] Appl. No.: 29,624

[52] U.S. Cl. .............. 60/39.28, 60/39.74, 251/137, 251/141
[51] Int. Cl. .............................................. F02c 9/08
[58] Field of Search......60/39.81, 39.79, 39.8, 39.74, 60/39.06, 39.14; 251/137, 141

[56] References Cited

UNITED STATES PATENTS

| | | |
|---|---|---|
| 2,884,009 | 4/1959 | Hetherington......60/39.74 UX |
| 3,095,902 | 7/1963 | Caton...................251/137 X |
| 3,348,559 | 10/1967 | Brothman....................137/47 |
| 3,520,133 | 7/1970 | Loft..........................60/39.14 |
| 2,579,723 | 12/1951 | Best.......................251/137 X |
| 2,798,769 | 7/1957 | Whitson.................251/137 X |
| 3,301,269 | 1/1967 | Marwood.............60/39.28 X |

FOREIGN PATENTS OR APPLICATIONS

| | | |
|---|---|---|
| 618,486 | 2/1949 | Great Britain............60/39.74 |

*Primary Examiner*—Clarence R. Gordon
*Attorney*—Craig, Antonelli and Hill

[57] ABSTRACT

Control system for metering fuel flow as a function of the parameters of a gas turbine engine comprising, at least, a compressor, a combustion chamber and a turbine, said control system featuring a two-position solenoid valve as a control element for the fuel metering mechanism which meters the minimum fuel flow in its closed position and the maximum fuel flow in its opened position, with intermediate values between minimum and maximum fuel flow being adjustable by a pulse time modulation signal of an electrical controller connected to said solenoid valve operating as a function of the parameters of a gas turbine engine.

22 Claims, 9 Drawing Figures

PATENTED SEP 5 1972

INVENTORS
ADOLF FEHLER
CHRISTIAN GREUNE
HILBERT HOLZHAUER

BY Craig, Antonelli, Stewart & Hill
ATTORNEYS

CONTROL SYSTEM FOR METERING THE FUEL FLOW IN GAS TURBINE ENGINES

The present invention relates to a control system used for metering the fuel flow as a function of the parameters of a gas turbine engine, at least, comprising a compressor, a combustion chamber and a turbine.

With control systems for gas turbine engines numerous parameters will have to be considered. Input quantities of the control system affecting the fuel flow are, for example, the set speed point and actual speed point of the gas turbine engine, the set and actual points of the exhaust gas temperature and the pressure and temperature of the ambient air.

For metering the fuel flow in a gas turbine engine as a function of the various parameters, it has been customary to employ, for instance, pneumatically, hydraulically or mechanically, operated actuating elements in the control systems; alternatively, it has been necessary to interlink a great number of such actuating elements in order to influence the fuel flow to the burners of the gas turbine engine as a function of the various parameters.

The disadvantages of such control systems consisting of a great number of actuating elements are as follows: high manufacturing efforts, hardly avoidable susceptibility to failures — with the resulting inaccuracies, mechanical friction losses and requirements for relatively large actuating forces as a result of the above.

It is the object of the present invention to provide a control system for metering the fuel flow to a gas turbine engine, which will eliminate the drawbacks of those known control systems mentioned above.

It is another object of the present invention to provide a control system of the type described which is intended to operate with an extremely low number of actuating elements.

It is a further object of the present invention to provide a control system of the type described which requires relatively simple manufacturing proceedures.

It is still another object of the present invention to provide a control system which is compact and has a low failure rate.

It is still a further object of the present invention to provide a control system which is designed for metering fuel flow in an optimum manner and as a function of a great number of parameters involved in fuel metering in accordance with the various operating conditions of the gas turbine engine.

For the attainment of the stated objects, the invention mainly proposes, for a control system of the above-mentioned type, to use a two-position solenoid valve as a control element for fuel metering, which valve meters the minimum fuel flow in its closed position and the maximum fuel flow in its open position, in which case intermediate values between minimum and maximum fuel flow could be selected by means of pulse time modulation of an electrical controller connected to the solenoid valve and operating as a function of the parameters of the gas turbine engine.

According to the invention, the two-position solenoid valve would only need to provide for the positions "OPEN" or "CLOSED". The modulation of the fuel flow can be effected by the "pulse-time" or "pulse-width modulation" of the electrical controller output. The final stage of the controller only consists of the conditions "conductive" or "non-conductive" and therefore can be operated as a switch. As the hysteresis of the valve is of no importance, it will also be possible to select an electrical valve drive system with hysteresis. This will then allow for the use of switching magnets with relatively high forces and low electrical power requirements. Furthermore, the final stage of the electrical controller can be of a relatively small size. The pulse operation is not detrimental to the gas turbine engine, since the pulses will be averaged by the time constants of the gas turbine engine, provided the pulse frequency does not drop below the minimum value.

In a further embodiment of the invention, the variable metering area for minimum fuel flow can be switched on permanently, while the variable metering area for maximum fuel flow can be switched on additionally by means of pulse-time modulation.

The invention is further advantageous in that the two-position solenoid valve can be made part of the fuel flow metering system which is equipped with a fuel nozzle.

In this manner, it will be possible to combine the fuel metering system, its associated control element, and its fuel nozzle into a compact, self-sustained unit. This will also permit the realization of a design, where only one moving control element is required which, moving as a piston in a cylinder, will clear the fuel flow to the nozzle, to a certain extent, and which, on the other hand, is designed as a magnet core being moved by the amount required for fuel metering by, e.g., excitation of a coil.

As a further embodiment of the invention, the two-position solenoid valve can preferably be designed as a dual-plunger solenoid valve, with armature surfaces and pole cores acting as limit stops. In this case, the two pole cores will limit the control stroke and thus, in connection with the fuel metering areas of the injection mechanism, the maximum and minimum fuel flow.

In order to regulate the maximum and minimum fuel flow, and thus the control stroke of the control element of the fuel metering system, the invention further proposes means for changing the position of the two limit stops associated with the two-position and the dual-plunger solenoid valve, respectively. For instance, the two limit stops could be moved against or away from each other in order to decrease or increase the control stroke of the solenoid valve.

Moreover, according to the invention, the complete solenoid system of the two-position and dual-plunger solenoid valve, respectively, could be moved relative to the flow area of the fuel injection mechanism.

According to the invention, it would further be suitable if, at least one of the limit stops of the two-position and dual-plunger solenoid valves, respectively, is made adjustable from the outside, thus permitting its position to be changed for increaseing or decreasing the maximum control stroke.

These and other objects, features and advantages of the present invention will be more apparent from the following detailed description when taken with the accompanying drawings, which illustrate several embodiments of the invention, and wherein.

Figure 1:
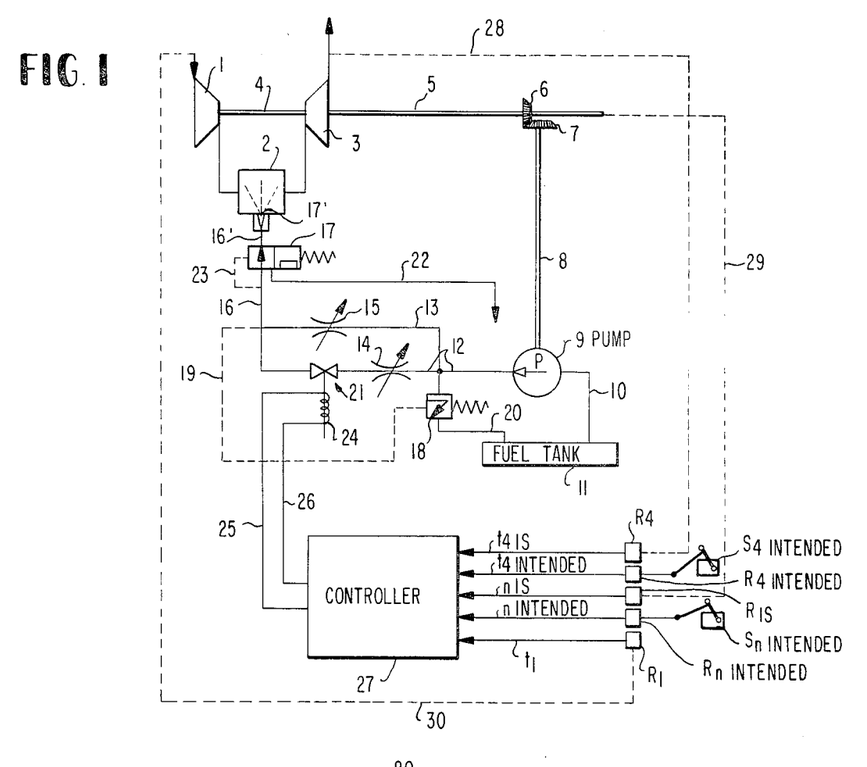
FIG. 1 is a first control circuit diagram of the invention.

FIG. 1 is a schematic view of a known gas turbine engine comprising a compressor 1, a combustion chamber 2 downstream of this compressor, and a compressor-turbine 3 arranged downstream of combustion chamber 2. The compressor-turbine 3 and the compressor 1 are connected to each other by a common shaft 4. From the compressor-turbine 3, a shaft 5 is branched off, which is equipped with a bevel-type gear 6 at its outer end. This bevel-type gear 6 engages with a corresponding bevel-type gear 7, which is connected with the fuel pump 9 via a shaft 8 driving this pump; the fuel is drawn from tank 11 via a line 10 and passed on, via line 16, to a drain valve 17 via the variable restrictors 14 and 15, arranged in lines 12, 13, via line 16'. From this valve 17 the fuel is then delivered to the fuel nozzle 17' associated with combustion chamber 2.

Furthermore, from FIG. 1 a differential pressure regulating valve 18 can be seen, which is connected to the variable restrictors 14, 15 via lines 12 and 13, and which is subjected to the pressure prevailing in line 16 — upstream of the drain valve 17 — the required connection being effected by line 19. This valve 18 is further connected with tank 11 via line 20. Upstream of the variable restrictor 14, a solenoid valve 21 is incorporated in line 16, whose actuation as a function of the relevant gas turbine engine parameters will be explained later on.

On the basis of the arrangement described, the pressure difference between the lines 12 and 16 is controlled by the differential pressure regulating valve 18, and the flow areas of the restrictors 14 and 15 will thus control the fuel flow to the fuel nozzle 17'.

When the solenoid valve 21 is closed, the minimum fuel flow is controlled by the flow area of restrictor 15. When the solenoid valve 21 (whose flow area is large as compared to restrictor 14) is opened, the overall fuel flow to the fuel nozzle 17' is controlled by the sum of the flow areas of restrictors 14 and 15, this flow being adjustable by means of restrictor 14.

As can further be seen from FIG. 1, from the drain valve 17 a line 22 is branched off, whose function is to blow any residual fuel to atmosphere that has remained in the fuel nozzle upon shutdown of the engine. A further line 23 branching off drain valve 17 is connected with line 16 for the purpose of returning the fuel from the drain valve when the gas turbine engine is shut down. Drain valves of this type are commonly known, but of no importance for the invention as far as the present case is concerned, and a more detailed description of this drain valve 17 can thus be dispensed with.

In order to be able to actuate the solenoid valve 21 for achieving the functions already described, as a function of the relevant gas turbine engine parameters, electrical lines 25, 26 connected to a coil 24 of solenoid valve 21 are coupled with an electrical controller 27 acting as an amplifier or comparator.

As can be seen from FIG. 1, this controller 27 is subject to the following parameters, as indicated by the arrows located at its input side:

Actual value of turbine outlet temperature ($t_{4\ is}$); nominal value of turbine outlet temperature ($t_{4\ intended}$), and compressor intake temperature ($t_1$). The above parameters are compared in the conventional manner in the controller 27, and they can thus effect the opening or closing of the solenoid valve by energizing coil 24, thus determining the fuel flow to the fuel nozzle 17' of combustion chamber 2 of the gas turbine engine on the basis of the arrangement of restrictors 14 and 15 that have already been described. For example, if the engine speed measured is less than the nominal speed, as indicated by the respective signal values applied to the controller, the coil 24 can be energized to open the solenoid valve and thereby increase the fuel flow to the nozzle. Individual control or compound control by the various parameters may be effected in a simple and conventional manner, as readily apparent.

The parameters $t_{4\ is}$, $n_{is}$ and $t_1$ are obtained from the corresponding points of the gas turbine engine via lines 28, 29, 30 and fed into the electrical controller 27 in the form of signals via, e.g., the standard associated conversion and calibration devices $R_4$, $R_{is}$, $R_1$ that are shown only diagrammatically in the enclosed drawings.

The signal values for the nominal speed value $n_{intended}$ as well as for the nominal value of the turbine outlet temperature $t_{4\ intended}$ can, for instance, be obtained from the manually controlled nominal value actuating elements $S_{n\ intended}$, $S_{4\ intended}$, that may take the form of conventional potentiometers and therefore are shown only diagrammatically in the enclosed drawings, and they can then be fed into the electrical controller 27 in the form of input signals via the standard calibration devices $R_{n\ intended}$, $R_{4\ intended}$.

Figure 2:
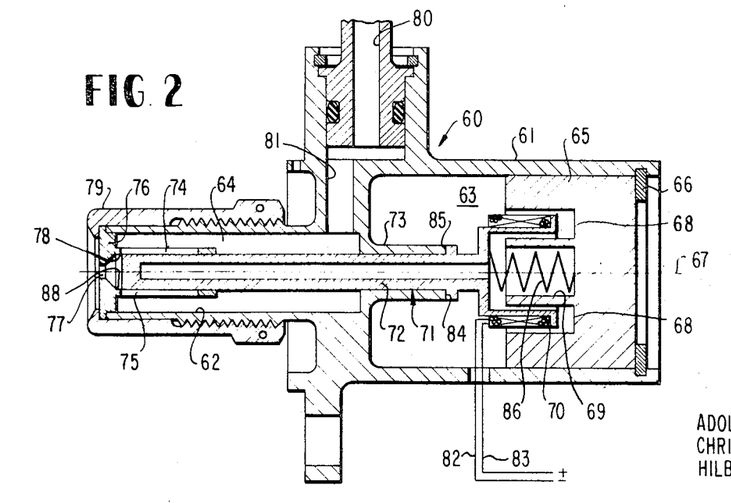
FIG. 2 is a first embodiment of a fuel injection mechanism comprising a fuel metering element.

FIG. 2 illustrates a solenoid-operated fuel injection mechanism 60 according to the present invention. This fuel injection mechanism is also designed to function as a fuel metering element and consists essentially of a large diameter cylindrical housing section 61 and a further, small diameter cylindrical housing section 62. The cylindrical housing sections 61 and 62 form the chambers 63 and 64, which are separated from each other. Within chamber 63, there is provided a magnetic core 65, which takes up about half of the space of this chamber; this core is fixed within the chamber 63 by means of an annular stop 66.

The magnetic core further features a circular recess 68 that is arranged coaxially to the longitudinal axis 67 of the injection mechanism and which acts as a magnet armature, as well as bore 69 enclosed by this recess 68. The fuel metering element 71, which essentially has the shape of a cylindrical hollow piston 72, protrudes into the recess 68, with its enlarged end being fitted with a magnet coil 70. This hollow piston 72 can be moved in an axial direction, within the chamber 63, in a sleeve 73 associated with the housing section 61. The piston 72 further moves in a bushing 76, which features the fuel metering areas 74 and 75 and also the fuel injection orifice 77, and which is placed on the outer end of the housing section 62 of the fuel injection mechanism. Another bushing 79, that is equipped with a fuel spray cone 78 in a coaxial direction relative to the fuel injection orifice 77, is screwed on the housing section 62; this arrangement insures that the bushing 76 is also fixed to the housing section 62.

From the fuel supply system of the gas turbine engine (FIG. 1), the fuel enters the chamber 64 of the fuel injection mechanism 60, via the bores 80, 81, from where it passes into the combustion chamber 2 (FIG. 1) via the fuel metering areas 74, 75 and via the fuel injection orifice 77.

Via the electrical lines 82, 83, which can be connected with an electrical controller 27 (FIG. 1), the magnet coil 70 is energized by the current pulses of this electrical controller 27, thus permitting the magnet coil 70 to enter the recess 68 to its full length, when maximum fuel flow metering is desired. This in turn permits the hollow piston 72 of the fuel metering element 71 to be shifted so that its collar 84 is separated from the end 85 of sleeve 73; this end 85 is directed inwardly and functions as a stop for the fuel metering element 71. The shifting of piston 72 is opposed by a pull-back spring 86 located within the recess 69 of the magnetic core 65.

For adjustment of the minimum fuel flow as a function of the output signals of the electrical controller 27 (FIG. 1) the end position (see FIG. 2) of the fuel metering element 71 is used, which — supported by the pull-back spring 86 — contacts the end 85 of sleeve 73 with its collar 84, thus effecting the smallest possible, minimum fuel flow to the fuel injection orifice 77 via the fuel metering areas 74, 75 at the locations 87, 88. Moreover, it will also be possible — as already described in connection with FIG. 1 — to select intermediate values between maximum and minimum fuel flow as a function of the pulse modulation of the electrical controller 27 (FIG. 1), as far as the fuel injection mechanism of FIG. 2 is concerned; this pulse modulation can be effected by means of the various parameters of the gas turbine engine (FIG. 1) to be fed into this controller.

Figure 3:
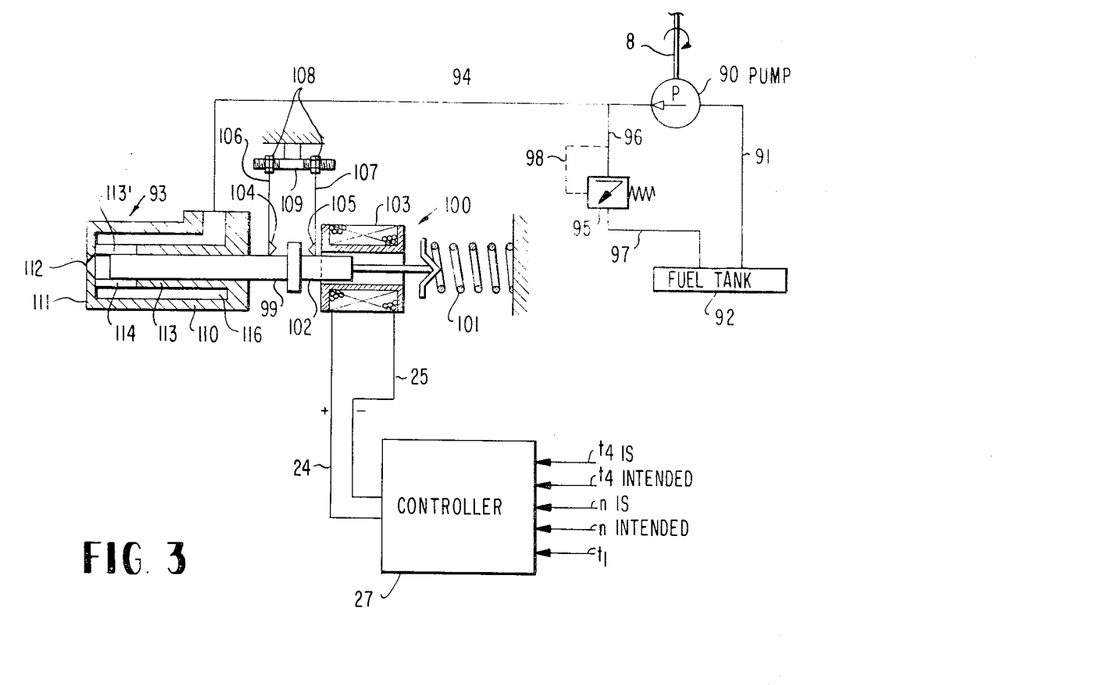
FIG. 3 is a second control circuit diagram of the invention, including a second embodiment of a fuel injection mechanism comprising a fuel metering element.

In the case of the embodiment of a fuel metering system according to the invention, as shown in FIG. 3, a pump 90 draws the fuel from the fuel tank 92, via a line 91, and delivers this fuel to the fuel injection mechanism 93, via a line 94. The pump 90 is driven by the shaft 8 (FIG. 1), which in turn is driven by the gas turbine engine, shown only diagrammatically in that figure. When the quantity supplied exceeds the requirements of the fuel to be metered to the engine, the surplus quantity is returned to the fuel tank via the pressure relief valve 95. For this purpose, the pressure relief valve 95 is connected both to line 94 via line 96 and to the fuel tank via line 97, with a further line 98 connecting the pressure relief valve to the line 96.

For metering of a maximum fuel flow, the piston 99 of the fuel injection mechanism 93 is attracted by a solenoid valve 100 against the action of a spring 101. In this case, the piston 99 will act as the armature 102 of coil 103 of the solenoid valve 100. Furthermore, the piston 99 is designed such that the stroke of the piston 99 is controlled by the stops 104, 105, and therefore the maximum and minimum fuel flows can be controlled approximately by these stops. The stops 104, 105 are attached to the brackets 106, 107, which in turn are secured to a screwed pin 109 via nuts 108. When one pair of nuts (or both pairs) 108 are loosened, the distance of the two stops 104, 105 relative to each other can be varied, and thus the stroke of piston 99 for maximum and minimum fuel flow, respectively. Medium fuel flows are effected by pulse width modulation; the piston will then move between the stops 104 and 105, and the dwell times at the stops 104 and 105 will continuously change with the fuel flow.

Similar to FIG. 2, in the type of embodiment according to FIG. 3, the fuel injection mechanism 93 also consists of a cylindrical housing 110 with an orifice 112 located in the outer end wall 111 of this housing 110 as well as with a bushing 113 located in the cylindrical housing 110; this bushing 113 locates the piston 99 and allowes its movement in an axial direction. The bushing 113 extends over its full length through the cylindrical housing 110 and features — on the side facing the orifice 112 — variable fuel flow areas 113' and 114, through which the fuel is passed to the orifice 112 via a drilled passage 115 of the cylindrical housing 110, after the fuel has left line 94.

The electrical controller 27 is identical with that shown in FIG. 1 and operates on the same parameters of the gas turbine engine as shown diagrammatically in FIG. 1 and as further explained previously on the basis of FIG. 1. In FIG. 3, the electrical lines leading from the electrical controller 27 to the coil 103 of the solenoid valve 100 are thus also identified by 24 and 25, as in FIG. 1.

Figure 4:
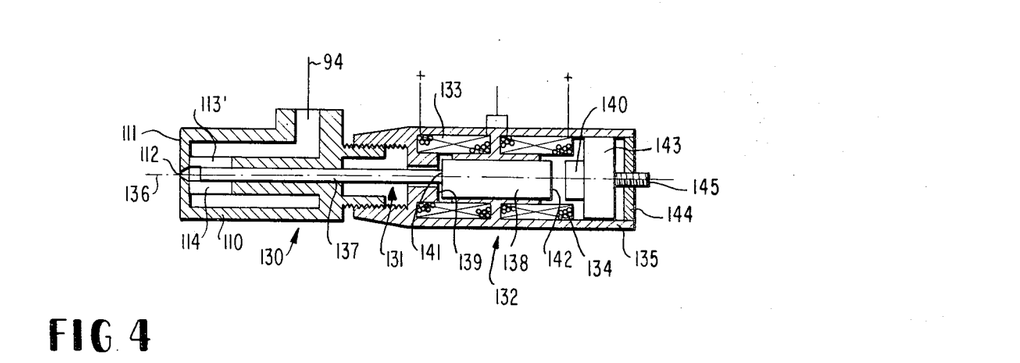
FIG. 4 is a third embodiment of a fuel injection mechanism comprising a fuel metering element.

FIG. 4 shows a further type of embodiment of a fuel injection mechanism 130 comprising a solenoid-operated fuel metering element 131, mainly distinguished from FIG. 3 by its taking the form of a dual-plunger solenoid valve. Two current coils 133, 134 are arranged in a cylindrical housing 135 at a distance from and coaxially to the longitudinal axis 136 of the fuel injection mechanism 130; these coils 133, 134 can be energized alternately or simultaneously by an electrical controller 27, shown in FIG. 1, and may be either differentially wound or connected to energizing voltage in opposite senses so as to provide differential control over an armature or plunger 138.

The fuel metering element 131 adjacent to these current coils 133, 134 takes the form of piston-type armature 138. The faces 141, 142 of the armature 138 constitute stops for limiting the maximum stroke of the armature and thus of the spool 137. The stroke of the armature 138 and thus that of the spool 137 connected to it is limited by the pole cores 139, 140 of dual-plunger solenoid valve 132, which are also located within the cylindrical housing 135, and which also constitute contact areas and thus stops for the faces 141, 142 of armature 138. For increasing or decreasing the control stroke of the spool 137, the pole core 140 can be moved axially within the cylindrical housing 135, via a piston 143, and the end position of this core 140 can be fixed by means of a grub screw 145 protruding through the end wall 144 of the cylindrical housing 135.

Figure 5:
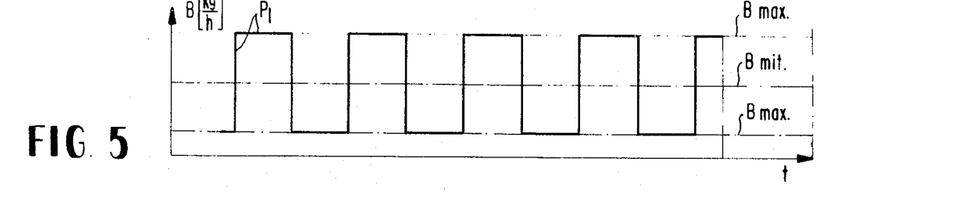
FIG. 5 is a fuel/time diagram describing the metering cycle of a medium fuel flow.
Figure 6:
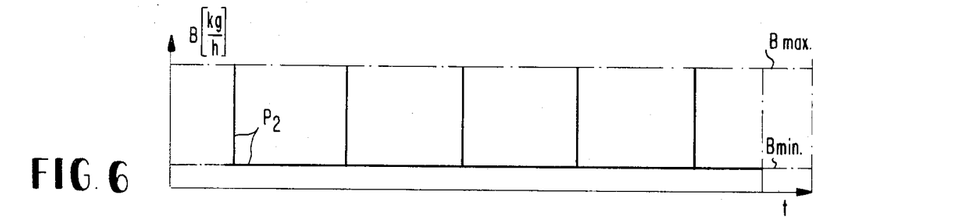
FIG. 6 is a fuel/time diagram describing the metering cycle of a minimum fuel flow.
Figure 7:
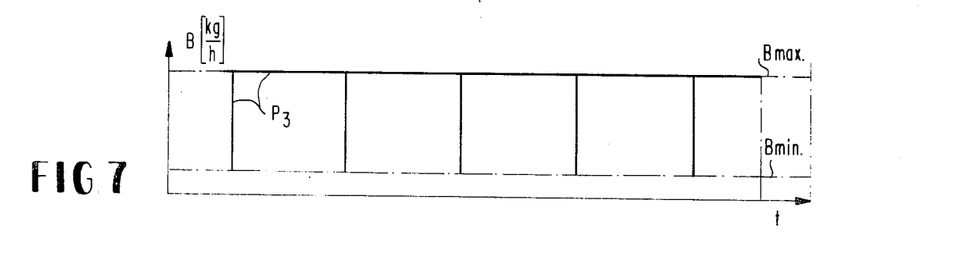
FIG. 7 is a fuel/time diagram describing the metering cycle of a maximum fuel flow.

The fuel/time diagrams in FIGS. 5, 6 and 7 illustrate metering of various fuel flows, for instance, as a function of those signals $t_{4\ is}$, $t_{4\ intended}$, $n_{is}$, $n_{intended}$ and $t_1$ (FIG. 1, where "is" and "intended" denote the actual and nominal value, respectively) that are fed into the electrical controller 27 as the controlling parameters of the gas turbine engine. These diagrams feature the following symbols: B = fuel flow, $t = time$, $B_{max}$ = medium fuel flow between $B_{mit}$ and $B_{min}$.

For metering a medium fuel flow, in accordance with Line $B_{mit}$ (FIG. 5), $P_1$ represents those pulses which are subject to continuous variation between the maximum and minimum fuel flows as a result of an alternate energizing of the current coils 133, 134 of a dual-plunger solenoid valve 132, as shown in FIG. 4, where the armature 138 connected with the piston 137 will remain in an intermediate position between $B_{max}$ and $B_{min}$, i.e., where the stops 141, 142 of armature 138 will be at approximately the same distance from the pole cores 139, 140, thus permitting the piston 137 to select a medium fuel flow $B_{mit}$ between $B_{max}$ and $B_{min}$, via the fuel metering areas 113', 114.

For metering a minimum fuel flow $B_{min}$ according to FIG. 6, only coil 133 is energized by the pulses $P_2$ obtained at the output of the electrical controller 27 (FIG. 1), when the armature 138 (FIG. 4) is retained at the pole core 139 with its stop 141.

For metering a maximum fuel flow $B_{max}$ according to FIG. 7, only coil 134 is energized by the pulses $P_3$ obtained at the output of the electrical controller 27 (FIG. 1), when the armature 138 is retained at the pole core 140 with its stop 142.

Figure 8:
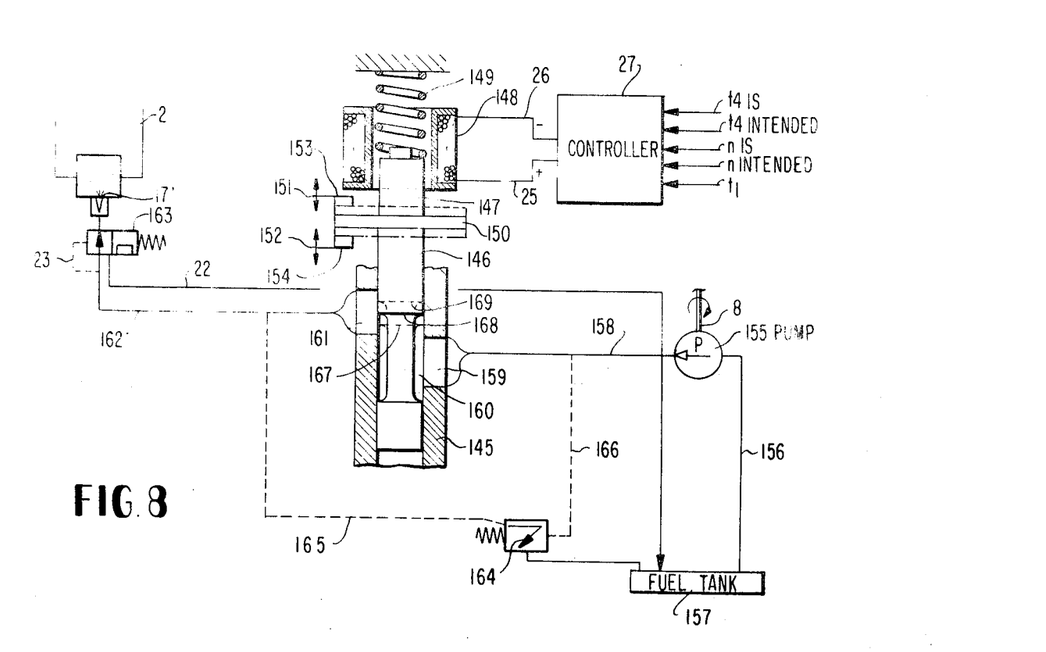
FIG. 8 is a third control circuit diagram including a fourth embodiment of a fuel injection mechanism comprising a fuel metering element.

In the embodiment shown in FIG. 8 a spool 146 is provided, which can move axially in a cylinder 145 (shown partially in FIG. 8) and whose one end is designed to form a pole core 147 that protrudes into the magnetic coil 148 over approximately half of its length, in this case. The spool 146 can be moved against the action of a pull-back spring 149 by energization of the magnetic coil 148. The maximum control stroke of the spool 146 is limited by a washer 150, tightly embracing this spool, in connection with the limit stops 153, 154 that mounted in any conventional way so that they can be adjusted in the direction of arrows 151, 152 towards or away from each other. Reference numeral 153 denotes the stop position of the spool 146 for metering the maximum fuel flow to the fuel nozzle 17', while reference numeral 154 identifies the stop position of the spool used for metering a minimum fuel flow to the fuel nozzle 17'.

A shaft 5 of the gas turbine engine shown diagrammatically in FIG. 1 drives the shaft 8, which in turn drives the fuel pump 155 drawing the fuel from the fuel tank 157 via line 156. The fuel pump 155 first delivers the fuel into a line 158, from where the fuel then enters the annular space 160 via an opening 159 in cylinder 145, this annular space being formed by a coaxial recess in spool 146. Another opening 161 in cylinder 145 is arranged opposite the opening 159. As can be seen from the drawing, the opening 161 is axially offset from opening 159, i.e., it is located closer to the upper end of cylinder 145.

In the position of the spool 146 as shown, with the washer 150 being located between the two stops 153 and 154, the recess 160 is thus fully opened with respect to opening 159, while only about half of the opening 161 is opened, so that less fuel than via opening 159 is supplied to combustion chamber 2, in which case the fuel first enters the recess 160 and then opening 161 and is then passed on to the drain valve 163, via line 162, from where it finally reaches the fuel nozzle 17' of combustion chamber 2.

As can be seen from FIG. 8, a differential pressure regulating valve 164 is connected via lines 165, 166 to the associated lines 158, 162, and it serves the purpose of maintaining the differential pressure at the metering area of opening 161.

For instance, when the magnet coil 148 is not energized, then the spring 149 will push the spool 146 with washer 150 (shown in broken lines) against stop 154 for minimum fuel flow, thus enabling a fixed minimum fuel flow to be metered to the fuel nozzle 17' due to the changed position of spool 146 with its metering edge 167.

With changed parameters $t_{4 \ is}$, $t_{4 \ intended}$, $n_{is}$, $n_{intended}$, $t_1$ (where "is" and "intended" denote the actual and nominal value, respectively), which can be obtained from a gas turbine engine to FIG. 1 and fed into the controller 27, resulting in the coil 148 being energized, the valve spool 146 can remain — as shown — between the stops 153 and 154 with its washer 150 in a position as indicated by the full lines, i.e., effected by pulse width or pulse time modulation of controller 27, whereby a medium fuel flow is supplied to the fuel nozzle 17' in accordance with the metering edge 168.

Further changing of the parameters of the gas turbine engine (FIG. 1) can necessitate a maximum fuel flow to be metered to the fuel nozzle 17'; when the coil 148 is energized accordingly, the valve spool 146, with its pole core 147, is further advanced (as compared to the position shown) against the action of spring 149, until the washer 150 contacts the stop 153 to assume the position shown in broken lines, whereby the maximum fuel flow can be adjusted in accordance with the end position of the metering edge 169 of spool 146.

The mode of operation of the drain valve 163 is similar to that of drain valve 17 (FIG. 1) and needs no further explanation.

Figure 9:
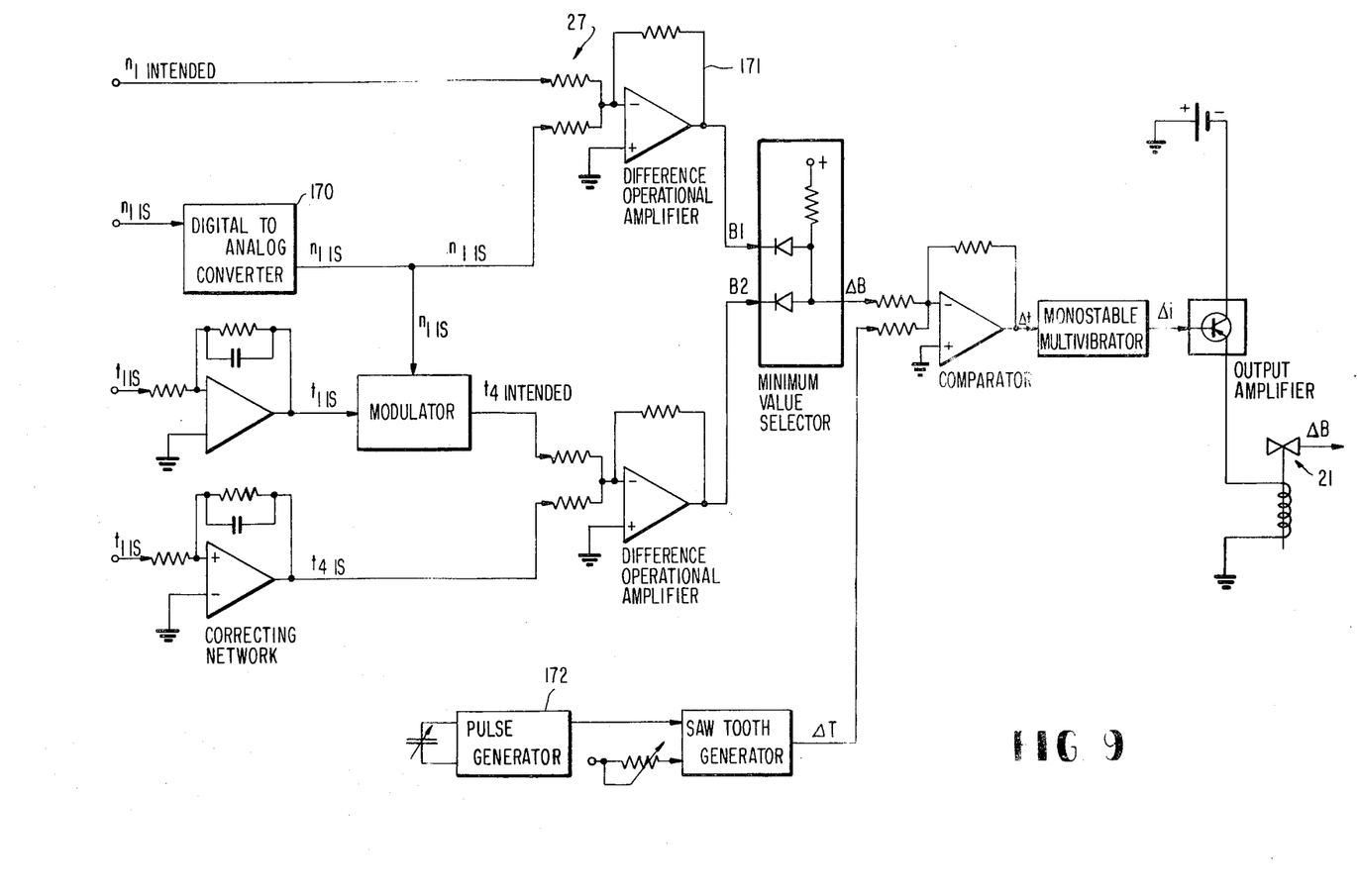
FIG. 9 is a schematic block diagram of an exemplary controller for use with the present invention.

As seen in FIG. 9, the required actual rotation or speed value for the rotation regulation circuit is obtained in a digital form as a series of pulses, the pulses are converted to an analog value in convertor 170 and compared to the rotation command (nominal) value $n_1$ intended in a difference operational amplifier 171. The rotation deviation is picked up by the difference operational amplifier 171 and measured by an adjustable, time-dependant linearly increasing function. Thereby the rotation deviation is converted into a time factor which determinates the opening period of the valve 21 within a time-period to be adjusted by the pulse generator 172. The output of convertor 170 in the rotation regulating circuit modulated with the signal $t_1$ is in the temperature regulating circuit in such a way, that by exceeding the temperature command (nominal) value, the temperature regulating circuit is always performing a primary function and determining the opening period of the valve 21.

Although the present invention has been described with reference to but several embodiments, it is to be understood that the scope of the invention is not limited to the specific details thereof, but is susceptible of numerous changes and modifications as would be apparent to one with normal skill in the pertinent technology.

What we claim is:

1. A control system for metering fuel flow as a function of the parameters of a gas turbine engine including at least a compressor, a combustion chamber and a turbine, comprising fuel source means for providing fuel to said combustion chamber, fuel metering means operatively associated with said fuel source means for metering the flow of fuel to said combustion chamber, said fuel metering means having a closed condition providing minimum fuel flow and an open condition providing maximum fuel flow, solenoid means for actuating said fuel metering means between said open and closed conditions, electrical control means providing a pulse time modulation signal which is a function of the parameters of said gas turbine engine, and means to apply said pulse time modulation signal directly to the solenoid of said solenoid means.

2. A control system as defined in claim 1, wherein said solenoid means actuates said fuel metering means to at least one of said open and closed conditions.

3. A control system as defined in claim 1, wherein said fuel metering means includes means for normally maintaining said closed condition, said solenoid actuating means being responsive to said signal from said electrical control means for actuating said fuel metering means to said open condition.

4. A control system as defined in claim 3, wherein said fuel metering means includes a fuel nozzle having a fuel metering inlet and a fuel injection orifice, and piston means slidable within said fuel nozzle for regulating the opening of said fuel metering inlet, said piston means being shifted in at least one direction between first and second positions representing the open and closed conditions of said fuel metering means by said solenoid means.

5. A control system as defined in claim 4, wherein said means for normally maintaining said closed condition is a spring biasing said piston means to said second position.

6. A control system as defined in claim 4, wherein said piston means includes a piston slideable in said fuel nozzle and having a stop member thereon engageable with respective abutments of said fuel nozzle for determining said first and second positions.

7. A control system as defined in claim 6, wherein said abutments of said fuel nozzle engageable with said stop member are adjustable as to position.

8. A control system as defined in claim 4, wherein said solenoid actuating means includes a magnetic core having an annular recess in one face thereof, and an annular winding secured to said piston means and extending at least partly into said annular recess in said magnetic core.

9. A control system as defined in claim 4, wherein said solenoid actuating means includes a solenoid winding and a core member extending at least partly into said solenoid winding, said core member being formed as an extension of said piston means.

10. A control system as defined in claim 9, wherein said means for normally maintaining said closed condition is a spring biasing said piston means to said second position.

11. A control system as defined in claim 1, wherein said fuel metering means includes a cylinder having a fuel inlet opening and a fuel outlet opening axially displaced from said fuel inlet opening, and a piston slideable in said cylinder and having a radially reduced portion forming an annular space with said cylinder, which annular space is capable of effecting communication between said fuel inlet opening and said fuel outlet opening to a variable extent in response to displacement of said piston.

12. A control system as defined in claim 11, wherein said fuel metering means further includes a drain valve connected in a fuel line between said fuel outlet opening and said combustion chamber.

13. A control system as defined in claim 11, wherein said piston is provided with a stop member engageable with respective abutments defining first and second positions corresponding to the open and closed conditions of said fuel metering means.

14. A control system as defined in claim 13, wherein said abutments are adjustable as to position.

15. A control system as defined in claim 13, wherein said solenoid actuating means includes winding means responsive to said pulse time modulation signal for effecting shifting of said piston to an equilibrium position between said first and second positions.

16. A control system as defined in claim 1, wherein said solenoid actuating means is provided in the form of a dual-plunger solenoid connected to said fuel metering means.

17. A control system as defined in claim 16, wherein said solenoid includes a pair of windings and an armature disposed within said windings capable of axial movement in either direction, said pair of windings being energized alternately by said pulse time modulation signal.

18. A control system as defined in claim 16, wherein said solenoid includes a pair of windings and an armature disposed within said windings capable of axial movement in either direction, said pair of windings being energized simultaneously in opposite directions by said pulse time modulation signal.

19. A control system as defined in claim 17, wherein said fuel metering means includes a fuel nozzle having a fuel metering inlet and a fuel injection orifice, and piston means slideable within said fuel nozzle for regulating the opening of said fuel metering inlet, said piston means being shifted by said solenoid between first and second positions representing the open and closed conditions of said fuel metering means.

20. A control system as defined in claim 19, further including abutment means for limiting movement of said armature, including first and second abutments defining positions of said armature for which said piston means connected to said armature will occupy said first and second positions, at least one of said abutments being adjustable.

2. A control system as defined in claim 1, characterized in that said fuel metering means includes first and second fuel supply lines connected in parallel with one another and disposed between the fuel source means and the combustion chamber, said first line including a first restrictor for limiting the flow through said first line to correspond to said condition of minimum fuel flow, said second line including a second restrictor for limiting the flow through said second line such that the combined flow through said first and second lines corresponds to said condition of maximum fuel flow, said second line further including valve means for operatively closing and opening said second line in response to actuation of said solenoid actuating means.

22. A control system as defined in claim 21, characterized in that said first and second restrictors are variable.

* * * * *